Jan. 18, 1966     D. S. SCHANER     3,229,778
HOOK SCALE WITH WEIGHT-INDICATING PROJECTOR
Filed Sept. 30, 1963     4 Sheets-Sheet 1
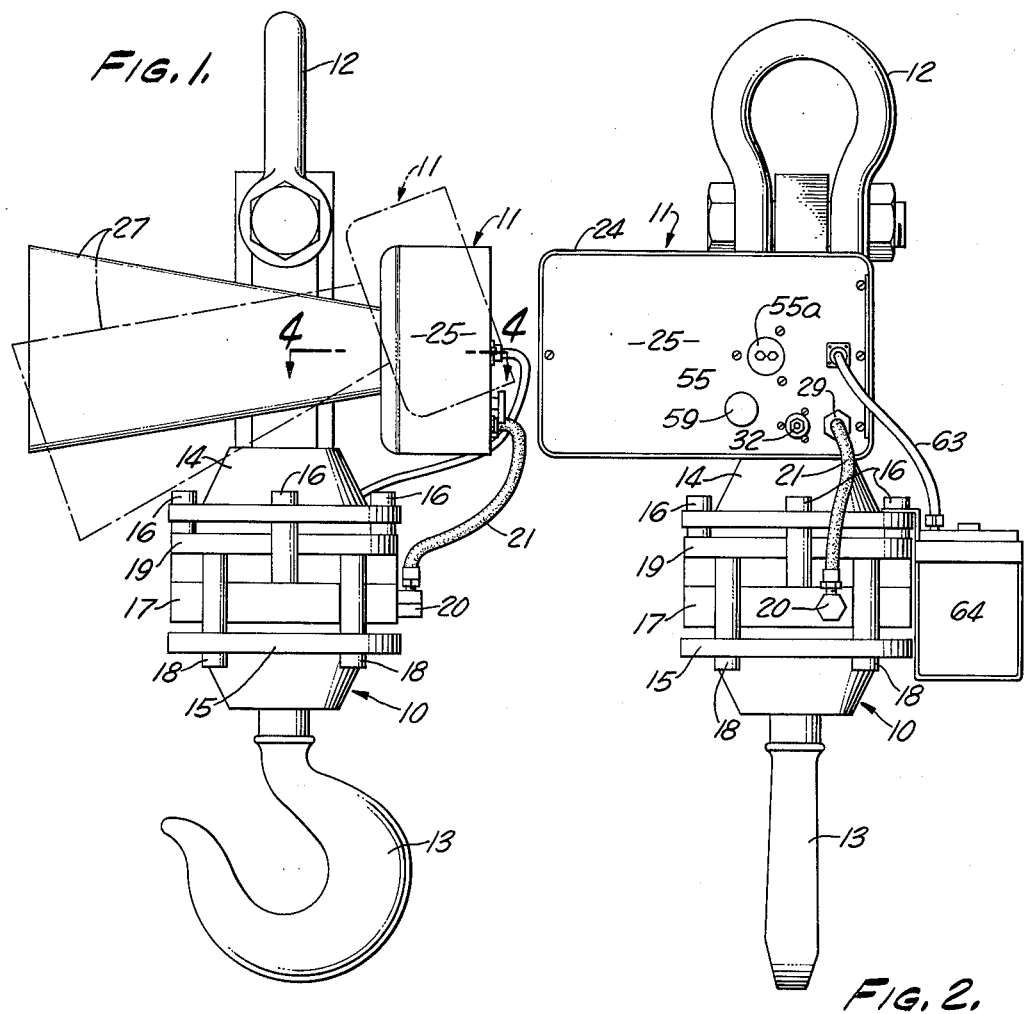
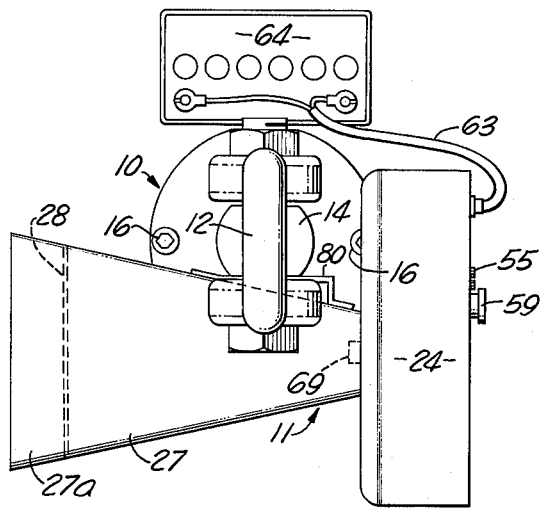
INVENTOR.
DAVID S. SCHANER
BY
*Lyon & Lyon*
ATTORNEYS

INVENTOR.
DAVID S. SCHANER
BY
ATTORNEYS

Jan. 18, 1966  D. S. SCHANER  3,229,778
HOOK SCALE WITH WEIGHT-INDICATING PROJECTOR
Filed Sept. 30, 1963  4 Sheets-Sheet 3

INVENTOR.
DAVID S. SCHANER
BY
ATTORNEYS.

Jan. 18, 1966     D. S. SCHANER     3,229,778
HOOK SCALE WITH WEIGHT-INDICATING PROJECTOR
Filed Sept. 30, 1963     4 Sheets-Sheet 4
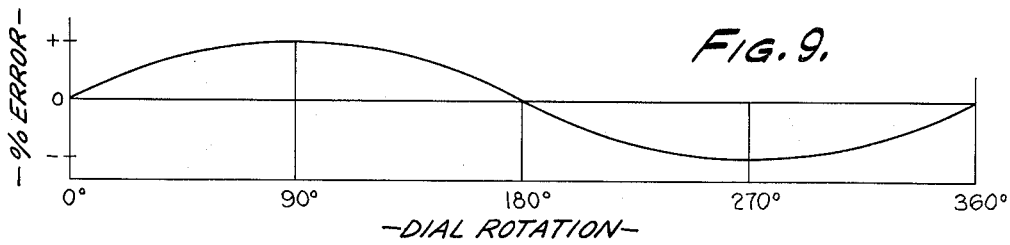
FIG. 9.
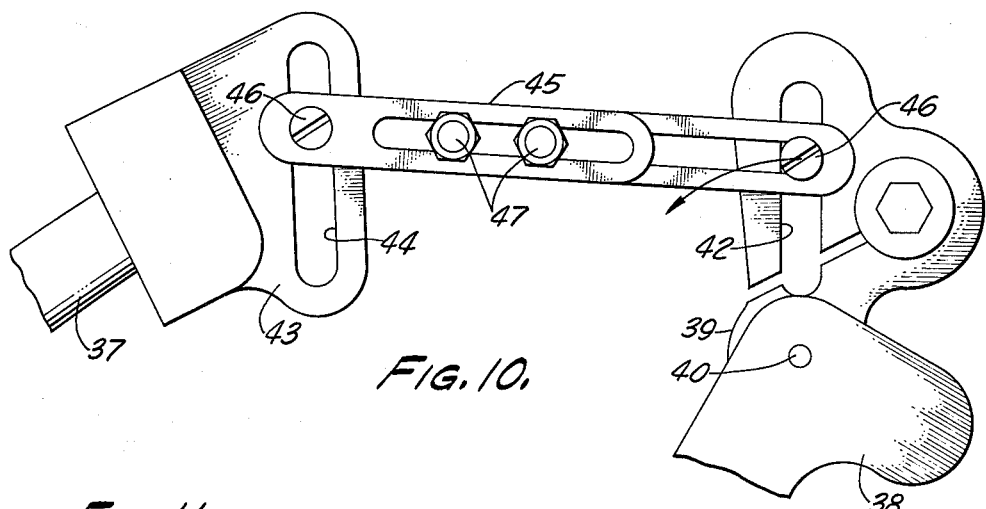
FIG. 10.
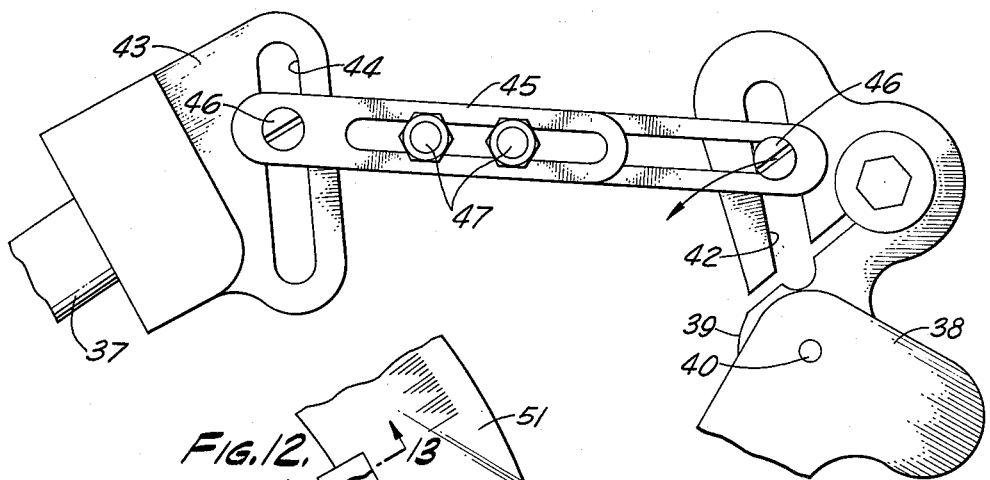
FIG. 11.
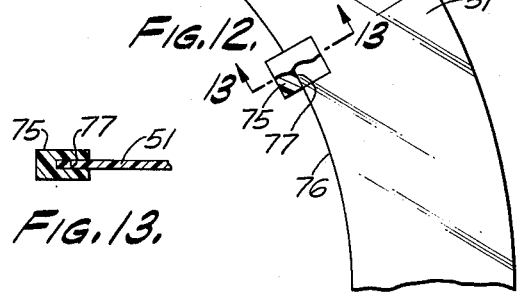
FIG. 12.
FIG. 13.
INVENTOR.
DAVID S. SCHANER
BY Lyon & Lyon
ATTORNEYS United States Patent Office 3,229,778
Patented Jan. 18, 1966

3,229,778
HOOK SCALE WITH WEIGHT-INDICATING PROJECTOR
David S. Schaner, Long Beach, Calif., assignor to Martin-Decker Corporation, Long Beach, Calif., a corporation of Delaware
Filed Sept. 30, 1963, Ser. No. 312,723
6 Claims. (Cl. 177—147)

This invention relates to portable hook scales for lifting and weighing loads and, in particular, is directed to such scales having hydraulic sensing means and means for indicating the weight of the load for visual observation.

In numerous situations it is more convenient to weigh a load while it is suspended from a crane or the like rather than setting the load on a platform scale to accomplish the weighing. Thus, numerous conventional hook scales have been developed which are suspended between the crane or the like and the load, and appropriate mechanical or hydraulic means operate a pointer to indicate the weight of the load on a dial face. Certain of these hook scales, particularly of the hydraulic sensing means type, have been found to be sufficiently accurate to permit employing the indicated weight for purposes of computing the price or the like of the material of the load or maintaining accurate inventory records or the like.

However, even though certain of such hook scales are extremely accurate in indicated weight, such accuracy is defeated if the reading of indicated weight cannot be readily and accurately determined by visual observation by the interested person. This problem is particularly troublesome with hook scales in that the hook scale is suspended from a crane or the like and may be at a substantial distance from the ground or the location of the interested observer when the load is suspended from the scale. For example, this has been found to be particularly true in steel warehouses and the like where the load is lifted by an overhead travelling bridge crane and yet the employee responsible for observing and recording the weight of the load may be located at an extreme distance from the location of the load. In such situations, the responsible employee is unable to observe the scale indicated weight and, therefore, it is necessary to transport the load to the location of the employee thereby partially defeating the convenience gaining by employing such a hook scale.

It is, therefore, an object of this invention to provide a hook scale of the hydraulic load cell type wherein the indicated weight is magnified and projected upon a screen mounted on the hook scale for permitting accurate visual observation of the indicated weight from substantial distances.

Another object of this invention is to provide a portable and self-contained hook scale having hydraulic sensing means for operating a Bourdon tube mechanism wherein the Bourdon tube mechanism turns a transparent dial having opaque indicia thereon for indicating weight and a light beam is passed through the appropriate portion of such dial and projected and magnified onto a screen to produce an observable reading of the indicated weight.

A further object of this invention is to provide a novel Bourdon tube actuated dial wherein the dial is rotated for producing a weight or pressure indication at a fixed pointer and means for causing a modification of the rotation of the dial to overcome the inherent inaccuracies produced by the Bourdon tube mechanism whereby a more accurate reading of actual pressure or weight is produced at the fixed pointer.

A still further object of this invention is to provide an accurate and reliable arrangement for using the hydraulic pressure developed by a hydraulic sensing means to produce a magnified reading corresponding to such pressure wherein the hydraulic pressure actuates a Bourdon tube mechanism to rotate a circular dial having appropriate indicia, a portion of such dial is magnified and projected on a screen for observation, and such circular dial is appropriately imbalanced to compensate for inaccuracies of rotation of the dial produced by the Bourdon tube mechanism.

Other and more detailed objects and advantages of this invention will appear from the following description and the accompanying drawings.

In the drawings:

FIGURE 1 is an elevation view of the hook scale of this invention.

FIGURE 2 is a side elevation view similar to FIGURE 1.

FIGURE 3 is a plan view of the hook scale of this invention shown in FIGURES 1 and 2.

FIGURE 9 is a graph of the qualitative value of inherent errors produced by a Bourdon tube mechanism rotating an indicator dial or pointer.

FIGURE 10 is an enlarged fragmentary view of a portion of the Bourdon tube mechanism shown in FIGURE 6 and illustrates an intermediate position of the movement of the mechanism by the Bourdon tube.

FIGURE 11 is similar to FIGURE 10 and illustrates a further position of the mechanism as moved by increased pressure in the Bourdon tube.

FIGURE 12 is a fragmentary view of a portion of the dial.

FIGURE 13 is a sectional elevation taken substantially on the line 13—13 of FIGURE 12.

Figure 4:
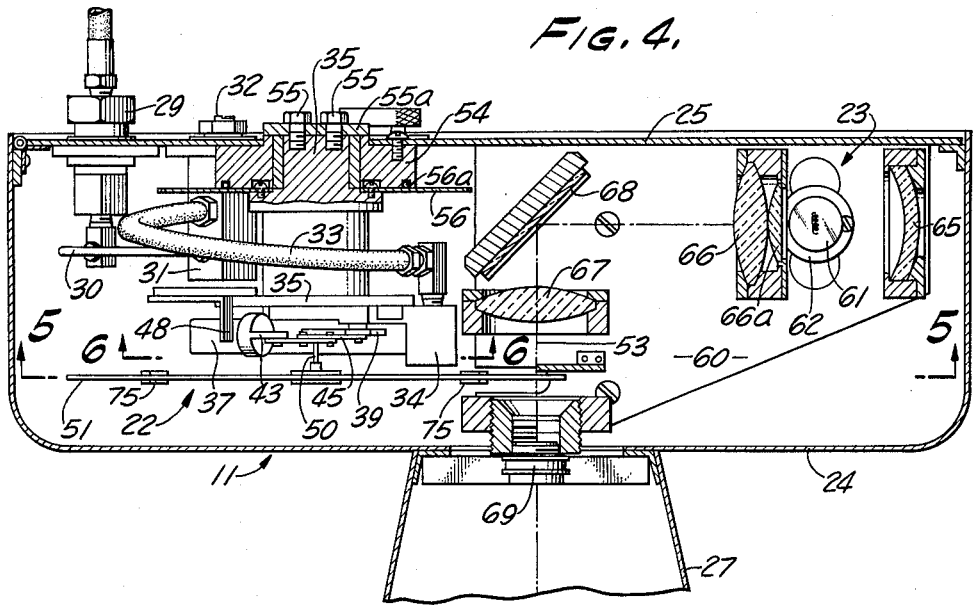
FIGURE 4 is a fragmentary sectional plan view of the Bourdon tube mechanism and the light projecting and magnifying arrangement taken substantially on the line 4—4 of FIGURE 1.

Referring now more particularly to FIGURES 1, 2 and 3, the device of this invention includes a portable hook assembly, generally designated 10, and a weight indicating and projecting apparatus, generally designated 11. The hook assembly 10 may be of any convenient configuration and construction for developing compressive hydraulic fluid pressures when the assembly is suspended from a crane or the like by the eye member 12 and a load is suspended from the swivel hook 13. By way of example, the hook assembly 10 may be similar in construction to that disclosed in the U.S. Letters Patent No. 3,004,558 entitled "Hydraulic Sensing Device for Load Indicating Apparatus," Franklin S. Crane, inventor, assigned to the same assignee as this application, whereby the eye member 12 is attached to a rigid element 14, the swivel hook 13 is attached to a rigid element 15, bolts 16 attach element 14 to a plate 17, and bolts 18 attach element 15 to a plate 19. A hydraulic pressure chamber or load cell is formed between the plates 17 and 19 by any convenient means such as a diaphragm between the plates and secured to one plate with hydraulic fluid in the chamber therebetween, and the other plate engaging the exterior of the diaphragm. As is well known to those skilled in the art, by such an arrangement a tension load from eye member 12 to hook 13 such as when supporting a load from the hook will result in a compressive hydraulic pressure being produced in the pressure chamber due to the upper plate 19 exerting a downward force and the lower plate 17 exerting a resistive upward force. A fitting 20 is connected to plate 17 and communicates through appropriate passageways to the hydraulic pressure chamber. A tube 21 connects fitting 20 to the weight indicating and projecting apparatus 11 to supply the hydraulic pressure to that apparatus.

Referring now more particularly to FIGURES 4, 5, 6 and 8, the weight indicating and projecting apparatus 11 is comprised of a weight-indicating mechanism, generally designated 22, and a light beam projection and magnifying system, generally designated 23, both mounted in a housing 24. Housing 24 includes a door 25 pivotally mounted by hinge 26 and forming the entire rear wall of the housing 24. The weight-indicating mechanism 22 and the light beam projection and magnifying system 23 are both mounted on the door 25 for ease of assembly and adjustment since the door may be opened to thereby expose the entire assembly of the operating portions of the apparatus 11. A projection housing 27 is mounted on the front of housing 24 and supports a projection screen 28 near the large end of the projection housing at a distance from housing 24. Screen 28 is of the rear projection type whereby a light image projected and focussed on the rear side is visible from the front of the screen. A portion 27a of the projection housing 27 extends beyond the screen 28 to form a shadow box for improved visibility and definition of the image projected on screen 28.

The housing 24 and projection housing 27 are mounted on hook assembly 10 by any convenient means, such as mounting bracket 80 secured to element 14, and may be pivoted to desired positions for better visibility of screen 28 as shown by dashed line in FIGURE 1.

The weight-indicating mechanism 22 is of the Bourdon tube type and is somewhat conventional in construction for that type of gauge except that a circular dial is rotated rather than roating a pointer as with conventional Bourdon tube gauges. The flexible tube 21 from the hook assembly 10 is connected to a fitting 29 which in turn extends through and is mounted on door 25. A rigid pressure tube 30 connects fitting 29 to an adjustable flow control block 31 mounted on door 25. Control block 31 is adjustable through screw 32 for controlling the rate of fluid flow from the hydraulic pressure chamber of the hook assembly 10 so that shock loading of the hook assembly such as might be caused by shifting of a load suspended from hook 13 is not fully and immediately transmitted to the Bourdon tube which otherwise might cause damage to the Bourdon tube. A flexible tube 33 connects control block 31 to a mounting block 34. Mounting block 34 is rigidly mounted on a mandrel 35 by any convenient means such as screws 36. A Bourdon tube 37 of the conventional curved configuration is mounted on mounting block 34 and is in fluid communication through block 34, flexible tube 33, control block 31, tube 30, fitting 29, and flexible tube 21 to the hydraulic pressure chamber of the hook assembly 10 for the Bourdon tube 37 to react to pressures produced in that chamber.

Figure 5:
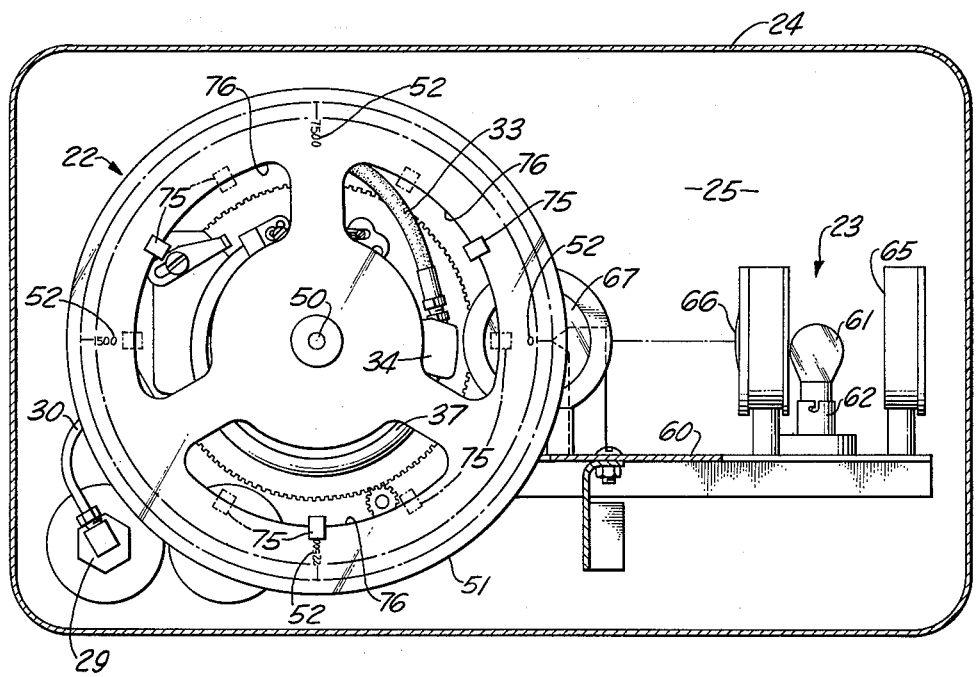
FIGURE 5 is a sectional elevation view taken substantially on the line 5—5 of FIGURE 4.
Figures 6, 7, 8:
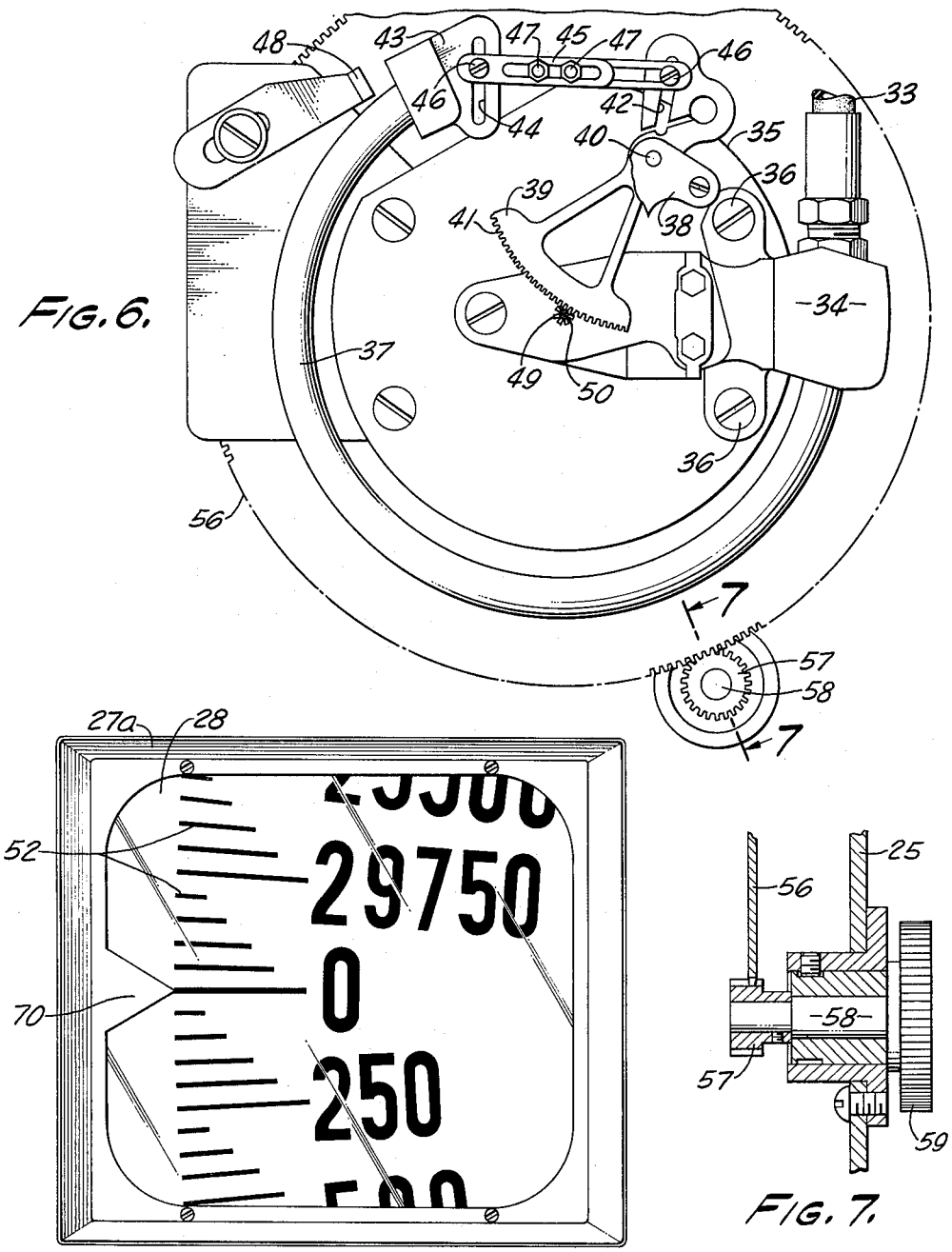
FIGURE 6 is a fragmentary sectional elevation view of the Bourdon tube mechanism taken substantially on the line 6—6 of FIGURE 4.
FIGURE 7 is a sectional view of the tare adjustment mechanism taken substantially on the line 7—7 of FIGURE 6.
FIGURE 8 is an elevation view of the projection screen with the dial indicating zero.

A bracket 38, shown in fragmentary portions in FIGURE 6 for clarity, is mounted on mandrel for pivotally supporting a quadrant gear member 39 for rotation about a shaft 40. Member 39 is provided with a curved segment of gear teeth 41 on one longitudinal end and at a radius from shaft 40. A mounting slot 42 is provided in the other longitudinal end of member 39. The free end of Bourdon tube 37 is provided with a tip bracket 43 having a mounting slot 44 therein. An adjustable link 45 is connected between bracket 43 and quadrant member 39 by means of screws 46 extending through and pivotally mounting the link to the slots 44 and 42, respectively. The appropriate length of adjustable link 45 is set by bolts 47. Thus, as fluid pressure is applied to Bourdon tube 37 thereby, in a known manner, causing bracket 43 to move to the left as viewed in FIGURES 5 and 6, the quadrant member 39 will be turned in a counterclockwise direction, also as viewed in FIGURES 5 and 6. A stop 48 is mounted on mandrel 35 for engaging bracket 43 to limit the maximum movement of Bourdon tube 37. A pinion gear 49 meshes with gear teeth 41 and is mounted on or comprises an integral portion of a shaft 50 which is in turn rotatably mounted on bracket 38. Thus, pivoting of quadrant member 39 causes rotation of shaft 50 and although it may be varied, it is preferred that the gear ratio be such that the full 360° that shaft 50 will be rotated will be caused by approximately 20°–25° pivoting of quadrant member 39.

A transparent circular dial 51 is mounted on the front end of shaft 50 and is therefore rotated by the movement of Bourdon tube 37 as caused by fluid pressure changes. Opaque indicia 52 representing the weight values is provided near the outer periphery of dial 51 and as the dial is rotated such indicia passes through the center line 53 of the light beam produced by the projection and magnifying system 23, hereinafter described. The dial 51 is oriented in such a manner as to cause the appropriate indicia 52 of the indicated weight to be positioned at center line 53. As for example, it may be seen in FIGURE 5 that the dial is in a position indicating zero weight suspended from the swivel hook 13 of the hook assembly 10. As a load is lifted by hook 13 the dial 51 will rotate in a clockwise direction, as viewed in FIGURE 5, thereby presenting new indicia to the location of center line 53. While the numerals of indicia 52 will be upside down at center line 53, such numerals are inverted by projection and magnifying system 23.

It is to be noted that the Bourdon tube 37 and the various mechanisms for causing rotation of the dial 51 due to movement of the Bourdon tube are mounted on the mandrel 35. Mandrel 35 extends through the door 25 and is pivotally mounted in a flange 54 that is mounted on door 25. A pair of screws 55 and a flange 55a retain the mandrel 35 within the flange. A gear 56 is mounted on mandrel 35 and engages a pinion gear 57. An O-ring 56a is positioned within a groove in flange 54 and engages gear 56 to deflect the gear to a "dished" shape and form a frictional lock therebetween. Pinion gear 57 is mounted on a shaft 58 which extends through door 25 and may be turned by knob 59. The mandrel 35 may be rotated in opposition to the frictional lock by rotating knob 59 thereby rotating the entire Bourdon tube mechanism including the dial 51 without affecting the operation of such mechanism. In this manner the zero indicia on the dial may be adjusted to the center line 53 as desired such as for compensating for tare weight suspended from the hook 13.

Referring now to the light beam projection and magnifying system 23, a bracket 60 is mounted on door 25 for supporting the system. A light 61 is removably mounted in a socket 62 and electrical power is supplied to the light through wires 63 from any convenient source such as a battery 64 mounted on the hook assembly 10. A concave reflector 65 is mounted behind light 61 for inverting and intensifying the light image produced. A set of condensing lenses 66, 66a and 67 are provided for concentrating the light image. A reflector 68 is provided for changing the direction of the light beam between lenses 66 and 67 to permit a more compact arrangement of the system 23 within the housing 24. The light beam passes through condensing lens 67 on the center line 53 and then passes through the dial 51 to a magnifying and projection lens 69. The image of the opaque indicia on the dial 51 at center line 53 is thereby projected onto the rear of the projection screen 28 and is visible from the front of the projection screen as shown in FIGURE 8.

An opaque pointer 70 is painted on the rear of screen 28 for appropriately registering the exact indicated weight.

As an alternative or in addition to pointer 70, a pointer 72 may be mounted on bracket 60 and positioned near the dial 51 such as between dial 51 and condensing lens 67. Thus the weight-indicating indicia is magnified many times for ease of observation without affecting the operation of the weight-indicating mechanism and the image of the indicia visible on screen 28 is far larger than would be practical by merely using a large conventional dial face and pointer, particularly with a portable hook scale of the disclosed type.

As is well known to those skilled in the art, individual Bourdon tubes have individual and unique response characteristics even though great care is taken in attempting to manufacture such tubes to desired specifications. Thus, when fitting a Bourdon tube to a gauge it is necessary to make various adjustments in the operating linkage to obtain the desired response by the pointer to calibrate the gauge under the full range of loads to be applied. Certain of such adjustments are made in the heretofore described adjustable link 45 by varying the length of the link and varying the position of attachment of the ends of the link by screws 46 to the Bourdon tube bracket 43 and the quadrant member 39. These calibrating adjustments are well known. As for example, if application of a given fluid pressure on Bourdon tube 37 is supposed to produce a given number of degrees of rotation of the pointer and actually produces a greater amount of rotation of the pointer, then one method of reducing the amount of such rotation would be to move the attachment of link 45 by screw 46 to slot 42 away from the pivot shaft 40 thereby producing a smaller amount of pivoting of member 39 for a given movement of Bourdon tube bracket 43. Moreover, after these calibrating adjustments have been made to produce, as near as possible, the desired response by the pointer throughout the entire range of loads to be used, it is well known that certain errors are still produced which cannot be compensated for by adjusting the link 45. One of these errors is qualitatively represented by the graph of FIGURE 9 and although the percent of error and the exact shape of the graph of such error may vary from gauge to gauge, the shape will be generally as shown in FIGURE 9 with the maximum positive error at 90° of rotation of the pointer (25% of the maximum load) and the maximum negative error at 270° of rotation of the pointer (75% of the maximum load). This error is a result of the inherent and inescapable inaccuracy of connecting the pivotally mounted quadrant member 39 to the end of the Bourdon tube. By comparing FIGURES 6, 10 and 11, it may be seen that the end of link 45 attached to member 39 by screw 46 moves in an arcuate path since member 39 is pivotally mounted on shaft 40 and the position of screw 46 is not varied after the heretofore described calibrations are made. This arcuate path has a radius equal to the distance between shaft 40 and screw 46 mounting the link to member 39. However, the movement of bracket 43 on the tip of Bourdon tube 37 is not a precise pivotal movement in an arcuate path but rather is closer to a straight line movement at least for the distances of movement involved. In the full range of movement of the quadrant member 39 from zero load to maximum load, it may be seen that the angle between the longitudinal axis of link 45 through the two screws 46 and the radius from shaft 40 to screw 46 mounting the link to member 39 varies from less than 90°, see FIGURE 6, to a value in excess of 90°, see FIGURE 11. The angular movement of quadrant member 39 for a given increment of the near-straight line movement of Bourdon tube tip bracket 43 is obviously different for different values of the heretofore described angle between link 45 and a radius from shaft 40, other than when such different angles are complementary such as 85° and 95°.

A well known solution has been developed for correcting the heretofore described error when the gauge employs a pointer which rotates for scanning a fixed dial face . Conventionally the poitner rotates in a clockwise direction and the dial face carries indicia indicating zero load at the bottom of the dial face, 25% of maximum load at 90° of rotation which will be at the lefthand side of the dial face, 50% maximum load at the top of the dial face, etc. Thus, the graph of FIGURE 9 illustrates that at 25% of maximum load the pointer will be indicating a greater load, i.e., the pointer has actually rotated more than 90° and is pointing slightly upward instead of directly to the left. Further, at 75% of maximum load the pointer will not have rotated the full 270° and will also be pointing slightly upwardly rather than directly to the right. Thus, it may be seen that the fixed dial face may merely be moved upwardly a small amount so that the center of rotation of the pointer is below the center of the dial face. In this way the pointer will indicate the proper values of 25% and 75% of maximum load even though additional errors will be introduced in the following ranges of loads: 10%–15%; 35%–40%; 60%–65%; and 85%–90% of maximum load. By compromising in the amount of dial face shift that is made, the error throughout the entire range of loads is minimized and such method has become conventional.

However, it may be seen that the weight-indicating mechanism 22 of this invention employs a transparent circular dial containing the weight indicia rather than a pointer which rotates to indicate the weight. The heretofore described conventional method of correcting for the type of error illustrated in FIGURE 9 cannot be employed since there is no fixed dial face that can be shifted relative to a rotating pointer. In order to correct for this error in indicated weight, by this invention a plurality of weights 75 are provided for imbalancing the dial 51. Referring more particularly to FIGURES 5, 12 and 13, the dial 51 is provided with slotted or relieved portions 76 between the axis of the dial and the indicia 52. The weights 75 are provided with a groove 77 approximately equal to the thickness of the dial 51 so that the weights may be movably fitted onto the dial at relieved portions 76. By appropriately positioning the weights 75 in various positions on the dial 51, such as the many positions shown by solid and dashed lines in FIGURE 5, the weight-indicating mechanism 22 may be calibrated to correct for the error illustrated by the graph of FIGURE 9. The weights or other means are first applied for balancing the dial 51 so that the normal calibration steps may be accomplished. The weights are then positioned for retarding the rotation of the dial at 90° of rotation from the zero position and for increasing the amount of rotation at 270° of rotation from that which would be caused by the Bourdon tube mechanism. In general this will usually include adding a weight 75 near the bottom of the dial when the dial is in the zero position. It is preferred that the weights 75 and the dial 51 be of plastic or the like so that when the appropriate positions for weights 75 have been determined by this calibration step, an appropriate solvent may be applied to the weights to secure same to the dial. Since the solvent will evaporate leaving the weights 75 secured to the dial 51, there will be no change in the desired imbalancing which would otherwise occur if a conventional adhesive or other fastening means were employed.

Having fully described my invention it is to be understood that I do not wish to be limited to the details herein set forth or to the details illustrated in the drawings, but my invention is of the full scope of the appended claims.

I claim:

1. In a portable hook scale to be suspended from a crane or the like for weighing loads, the combination of: a weight-sensing assembly including first means for suspending the assembly from the crane, second means for attaching to the load, and hydraulic pressure chamber means containing a liquid for producing a hydraulic pressure corresponding to the weight of the load; a weight-indicating mechanism mounted on said assembly and having a rotatable shaft, said weight-indicating mechanism including a Bourdon tube mechanism for causing turning of said shaft in response to the hydraulic pressure developed in said pressure chamber means, a transparent dial mounted on said shaft and having opaque indicia of weight values; a screen mounted on the assembly in spaced relation to said dial, and means for projecting a light beam through a portion of said indicia and projecting and magnifying that portion on said screen for visual observation of the weight value of the load.

2. In a portable hook scale to be suspended from a crane or the like for weighing loads, the combination of: a weight-sensing assembly including first means for suspending the assembly from the crane, second means for attaching to the load, and hydraulic pressure chamber means containing a liquid for producing a hydraulic pressure corresponding to the weight of the load; a weight-indicating mechanism mounted on said assembly and including a Bourdon tube, a rotatable shaft having a gear, a pivotally mounted quadrant member having teeth meshing with said gear, a link pivotally connecting the end of the Bourdon tube to said member for causing pivoting of said member and in turn causing rotation of said shaft in response to the hydraulic pressure developed in said pressure chamber means which causes movement of the end of said Bourdon tube, and a transparent circular dial mounted on said shaft and having opaque indicia of weight values, said dial positioned in at least a near vertical plane; a screen mounted on the assembly in spaced relation to said dial, means for projecting and magnifying a portion of said indicia on said screen for visual observation of the weight value of the load, and means on said dial for imbalancing said dial relative to the axis of said shaft for assisting and retarding rotation of said dial at predetermined positions of orientation for correcting the errors in rotating said dial caused by the geometric relation of said Bourdon tube end moving in a relatively straight line and causing pivotal movement of said quadrant member about a fixed axis.

3. In a portable hook scale to be suspended from a crane or the like for weighing loads, the combination of: a weight-sensing assembly including first means for suspending the assembly from the crane, second means for attaching to the load, and hydraulic pressure chamber means containing a liquid for producing a hydraulic pressure corresponding to the weight of the load; a weight-indicating mechanism mounted on said assembly and having a rotatable shaft, said indicating mechanism including a Bourdon tube mechanism for causing turning of said shaft in response to the hydraulic pressure developed in said pressure chamber means, a transparent circular dial mounted on said shaft and having opaque indicia of weight values thereon, a rear projection type screen mounted on the assembly spaced from said dial, means for projecting and magnifying a portion of said indicia on said screen for visual observation of the weight value of the load, said last-mentioned means including a light, a reflector behind the light, a condensing lens system in front of the light for passing a light beam through that portion of the dial having said indicia, and a lens system for then magnifying and projecting that light beam onto said screen.

4. The subcombination of a circular dial for use in combination with a Bourdon tube pressure indicating mechanism having a horizontal shaft which is rotated in response to pressure changes in the Bourdon tube, comprising; a circular dial mounted on said shaft and positioned in at least a near vertical plane, and means on said dial for imbalancing said dial relative to the axis of said shaft for assisting and retarding rotation of said dial at predetermined positions of orientation for correcting the inherent errors in rotating said dial as caused by the geometric relation of said Bourdon tube end moving in a relatively straight line and serially causing rotating movement of said shaft.

5. In a portable hook scale for suspending from a crane or the like for weighing loads, the combination of: a weight-sensing assembly including first means for suspending the assembly from the crane, second means for attaching to the load, and hydraulic pressure chamber means containing a liquid for producing a hydraulic pressure corresponding to the weight of the load; a weight indicating mechanism mounted on said assembly and having a rotatable shaft positioned on a relatively horizontal axis, said weight indicating mechanism including a Bourdon tube mechanism for causing turning of said shaft in response to the hydraulic pressure developed in said pressure chamber means, a transparent dial mounted on said shaft and having opaque indicia of weight values, said dial positioned in at least a near vertical plane, means on said dial for imbalancing said dial relative to the axis of said shaft for assisting and retarding rotation of said dial at predetermined positions of orientation for correcting inherent errors in the rotation of said dial as caused by the geometric relation of said Bourdon tube mechanism causing rotating of said shaft; a screen mounted on the assembly in spaced relation to said dial, and means for projecting a light beam through a portion of said indicia and projecting and magnifying that portion of said screen for visual observation of the weight value of the load.

6. The subcombination of a weight-indicating mechanism for use in combination with a weight-sensing assembly producing weight responsive hydraulic pressures, the combination of: a Bourdon tube mechanism having a shaft and means for causing rotation of said shaft in response to the hydraulic pressure from the weight-sensing assembly, a circular dial mounted on said shaft and having indicia of weight values located near the periphery thereof, said dial positioned in at least a near vertical plane, and means on said dial for imbalancing said dial relative to the axis of said shaft for assisting and retarding rotation of said dial at predetermined positions of orientation for correcting the errors in rotating said dial as caused by the geometric relation of said Bourdon tube mechanism for causing rotation of said shaft.

References Cited by the Examiner

UNITED STATES PATENTS

| | | | |
|---|---|---|---|
| 507,009 | 10/1893 | Jackson | 177—208 |
| 751,295 | 2/1904 | Jones | 177—208 |
| 1,070,461 | 8/1913 | Harback | 177—208 |
| 1,236,532 | 8/1917 | Beard et al. | 177—208 |
| 1,567,224 | 12/1925 | Baage | 177—178 |
| 1,631,890 | 6/1927 | Redick | 177—208 |
| 1,904,542 | 4/1933 | Schaper | 177—208 |
| 1,997,864 | 4/1935 | Hill | 177—208 |
| 2,042,627 | 6/1936 | Quinn | 177—17 |
| 2,304,363 | 12/1942 | Johansen | 177—208 |
| 2,304,402 | 12/1942 | Faulkner | 177—208 |
| 2,312,716 | 3/1943 | Hopkins | 73—413 |
| 2,493,133 | 1/1950 | Green | 88—24 |
| 2,530,068 | 11/1950 | McCabe | 73—386 |
| 2,620,177 | 12/1952 | Wise | 177—208 |
| 2,676,515 | 4/1954 | Diehl | 88—24 |
| 2,765,654 | 10/1956 | Greer et al. | 73—141 |
| 2,885,536 | 5/1959 | Green et al. | 240—2.1 |
| 2,931,638 | 4/1960 | Weber | 177—141 |
| 2,932,501 | 4/1960 | Hicks | 177—208 |
| 3,017,938 | 1/1962 | Polich | 177—141 |
| 3,067,617 | 12/1962 | Buck | 73—411 |
| 3,108,649 | 10/1963 | Hamilton | 177/208 |

LEO SMILOW, *Primary Examiner.*

LEYLAND M. MARTIN, *Examiner.*